United States Patent
Kaneko et al.

(10) Patent No.: US 10,927,747 B2
(45) Date of Patent: Feb. 23, 2021

(54) CONTROLLER FOR COOLING SYSTEM OF INTERNAL COMBUSTION ENGINE

(71) Applicant: TOYOTA JIDOSHA KABUSHIKI KAISHA, Toyota (JP)

(72) Inventors: Rihito Kaneko, Miyoshi (JP); Noboru Takagi, Toyota (JP); Naoto Hisaminato, Toyota (JP); Mitsuru Yamaguchi, Nagoya (JP); Hirokazu Andoh, Seto (JP); Masaaki Yamaguchi, Okazaki (JP); Yoshihiro Furuya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/001,092

(22) Filed: Jun. 6, 2018

(65) Prior Publication Data
US 2019/0010857 A1    Jan. 10, 2019

(30) Foreign Application Priority Data
Jul. 5, 2017 (JP) .............. JP2017-131803

(51) Int. Cl.
*F01P 7/14* (2006.01)
*F01P 5/10* (2006.01)
(Continued)

(52) U.S. Cl.
CPC .............. *F01P 7/14* (2013.01); *B60K 11/02* (2013.01); *F01P 3/02* (2013.01); *F01P 5/10* (2013.01);
(Continued)

(58) Field of Classification Search
CPC ...... F01P 7/14; F01P 7/164; F01P 5/10; F01P 3/02; F01P 2007/146; F01P 2003/021; F01P 2023/08; F01P 7/167; B60K 11/02
See application file for complete search history.

(56) References Cited

U.S. PATENT DOCUMENTS 4,319,547 A * 3/1982 Bierling ............... F01P 7/165
                                                     123/41.08
4,628,872 A * 12/1986 Ogawa .................... B60H 1/08
                                                     123/41.27
(Continued)

FOREIGN PATENT DOCUMENTS

JP    2004-156490 A    6/2004
JP    2004-301062 A    10/2004
(Continued)

*Primary Examiner* — Grant Moubry
(74) *Attorney, Agent, or Firm* — Oblon, McClelland, Maier & Neustadt, L.L.P.

(57) ABSTRACT

A cooling system of an internal combustion engine includes an adjustment valve configured to adjust a flow rate of a cooling liquid discharged from a water jacket. A controller for the cooling system includes circuitry configured to execute flow-restriction control that controls the adjustment valve to restrict discharge of the cooling liquid from the water jacket, thereby increasing temperature of an engine body. The circuitry is configured to execute the flow-restriction control so that temperature of the cooling liquid in the water jacket at which the flow-restriction control is terminated is lower when an ambient pressure is low than when the ambient pressure is high.

6 Claims, 6 Drawing Sheets

(51) Int. Cl.
  *F01P 3/02* (2006.01)
  *B60K 11/02* (2006.01)
  *F01P 7/16* (2006.01)
(52) U.S. Cl.
  CPC ......... *F01P 7/167* (2013.01); *F01P 2003/021* (2013.01); *F01P 2007/146* (2013.01); *F01P 2023/08* (2013.01)

(56) References Cited

U.S. PATENT DOCUMENTS

| | | | | |
|---|---|---|---|---|
| 7,182,048 B2* | 2/2007 | Nakano | ............... | F01P 7/164 |
| | | | | 123/41.1 |
| 7,207,297 B2* | 4/2007 | Hayami | ............... | F01P 7/164 |
| | | | | 123/41.1 |
| 2015/0233713 A1* | 8/2015 | Wolf | ............... | G01C 5/06 |
| | | | | 702/166 |

FOREIGN PATENT DOCUMENTS

| | | |
|---|---|---|
| JP | 2006-183523 | 7/2006 |
| JP | 2006-258006 | 9/2006 |
| JP | 2008-286025 A | 11/2008 |
| JP | 2009-068363 | 4/2009 |
| JP | 2009-156195 A | 7/2009 |
| JP | 2013-108354 | 6/2013 |
| JP | 2013-124656 | 6/2013 |
| JP | 2015-010577 A | 1/2015 |
| JP | 2016-000972 A | 1/2016 |

* cited by examiner

CONTROLLER FOR COOLING SYSTEM OF INTERNAL COMBUSTION ENGINE

BACKGROUND ART

The present invention relates to a controller for a cooling system of an internal combustion engine.

Japanese Laid-Open Patent Publication No. 2013-108354 describes a cooling system of an internal combustion engine that includes a cooling water passage allowing cooling water to flow to an engine body. The cooling water passage includes a water jacket that cools cylinders of the engine body. The cooling water passage further includes an inlet passage having a first end connected to the water jacket and a second end connected to a water pump. The water pump supplies the cooling water through the inlet passage to the water jacket. Additionally, the water jacket is connected to an outlet passage that discharges the cooling water from the water jacket. The outlet passage has a first end connected to the water jacket and a second end opposite to the first end. The second end is divided into two passages. A first one of the two passages is connected to a radiator pipe that is in communication with the radiator. A second one of the two passages is connected to a device pipe that is in communication with various devices (e.g., throttle body) of the internal combustion engine. The device pipe includes an electric valve capable of restricting the flow of the cooling water in the device pipe. When the temperature of the cooling water is lower than or equal to a predetermined temperature, the cooling system described in the above publication closes the electric valve to interrupt the flow of the cooling water in the device pipe. This limits dissipation of heat from the cooling water and results in an increase in the temperature of the engine body.

SUMMARY OF THE INVENTION

In the cooling system described in the above publication, the electric valve remains closed until the temperature of the cooling water becomes higher than or equal to the predetermined temperature. A vehicle including such a cooling system may be used at high altitudes, that is, where the ambient pressure is low. The boiling point of cooling water changes in accordance with the ambient pressure applied to the cooling water. Thus, as described above, when the temperature of the cooling water is increased to the predetermined temperature so that the temperature of the engine body increases, the cooling water may boil depending on the ambient pressure.

To solve the above problem, a controller for a cooling system of an internal combustion engine is provided. The cooling system includes a water jacket formed in an engine body of the internal combustion engine and including a passage for a cooling liquid that cools the engine body, a cooling liquid pump configured to supply the cooling liquid to the water jacket, and an adjustment valve configured to adjust a flow rate of the cooling liquid discharged from the water jacket. The controller includes circuitry configured to execute flow-restriction control that controls the adjustment valve to restrict discharge of the cooling liquid from the water jacket, thereby increasing temperature of the engine body. The circuitry is configured to execute the flow-restriction control so that temperature of the cooling liquid in the water jacket at which the flow-restriction control is terminated is lower when an ambient pressure is low than when the ambient pressure is high.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a controller for a cooling system of an internal combustion engine will now be described with reference to FIGS. 1 to 9. The cooling system of the internal combustion engine is installed in a vehicle to circulate cooling water as a cooling liquid.

Figure 1:
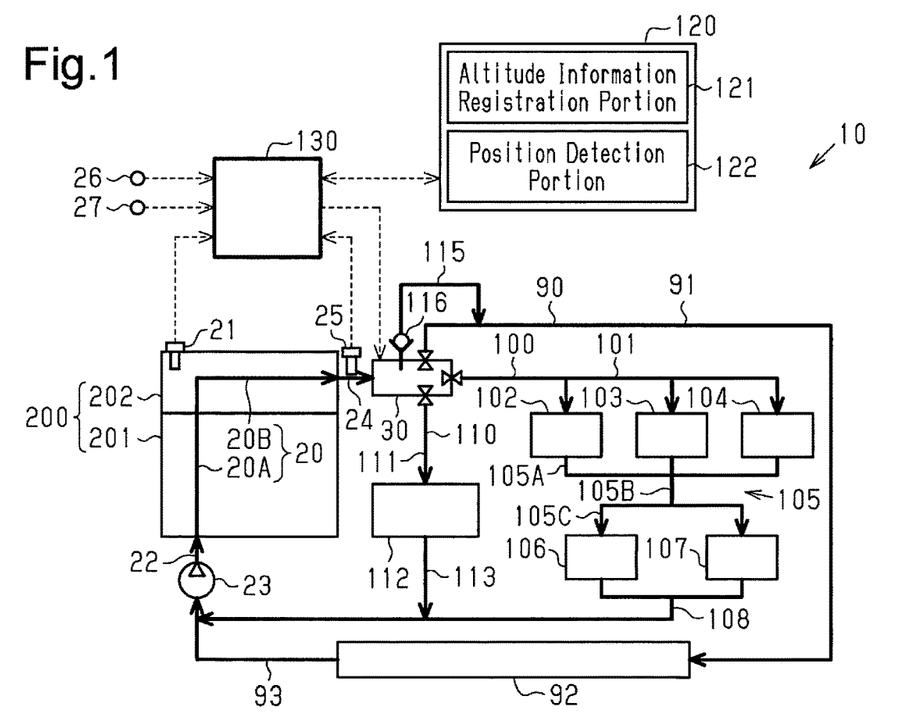
FIG. 1 is a schematic configuration diagram of one embodiment of a controller for a cooling system of an internal combustion engine.

As shown in FIG. 1, the internal combustion engine has an engine body 200 including a cylinder block 201 and a cylinder head 202 coupled to the upper end of the cylinder block 201. In the present embodiment, the side of the cylinder block 201 to which the cylinder head 202 is coupled is referred to as the upper side, and its opposite side is referred to as the lower side. A cooling system 10 of the internal combustion engine includes a water jacket 20 formed in the engine body 200. The water jacket 20 includes a block-side water jacket 20A, which is formed on the cylinder block 201, and, a head-side water jacket 20B, which is formed on the cylinder head 202 and is in communication with the block-side water jacket 20A. The cylinder head 202 includes a first water temperature sensor 21 detecting the temperature of the cooling water in the head-side water jacket 20B.

The water jacket 20 has a first end that is open in the cylinder block 201. The opening, that is, the first end of the water jacket 20, is connected to a first end of an inlet pipe 22. The inlet pipe 22 has a second end connected to a cooling water pump 23. The cooling water pump 23 is of an engine-driven type that is driven by a crankshaft of the internal combustion engine. When the cooling water pump 23 is driven with rotation of the crankshaft, the cooling water is supplied from the cooling water pump 23 through the inlet pipe 22 to the water jacket 20.

The water jacket 20 has a second end that is open in the cylinder head 202. The opening, that is, the second end of the water jacket 20, is connected to a first end of an outlet pipe 24. The outlet pipe 24 has a second end connected to an adjustment valve 30. The outlet pipe 24 includes a second water temperature sensor 25 detecting the temperature of the cooling water flowing through the outlet pipe 24.

The adjustment valve 30 includes three cooling water discharge ports. A first one of the three discharge ports is connected to a first cooling water path 90 that allows the cooling water to flow via a radiator 92. The first cooling water path 90 includes a first radiator pipe 91 having a first end connected to the discharge port, the radiator 92 connected to a second end of the first radiator pipe 91, and a second radiator pipe 93 connecting the radiator 92 to the cooling water pump 23.

A second one of the three discharge ports in the adjustment valve 30 is connected to a second cooling water path 100 that allows the cooling water to flow via devices arranged at various portions of the internal combustion engine such as a throttle body 102 and an EGR valve 103. The second cooling water path 100 includes a first device pipe 101 having a first end connected to the discharge port. The first device pipe 101 is divided into three braches at a downstream side. The ends of the three branches are respectively connected to the throttle body 102, the EGR valve 103, and an EGR cooler 104. The second cooling water path 100 includes a second device pipe 105. The second device pipe 105 includes three upstream branches 105A, a converged portion 105B connected to the upstream branches 105A, and two downstream branches 105C connected to the converged portion 105B. The upstream ends of the three upstream branches 105A are respectively connected to the throttle body 102, the EGR valve 103, and the EGR cooler 104. The converged portion 105B forms a single passage. The downstream ends of the two downstream branches 105C are respectively connected to an oil cooler 106 and an ATF warmer 107. The second cooling water path 100 includes a third device pipe 108. The third device pipe 108 is divided into two branches at an upstream side. The ends of the two branches are respectively connected to the oil cooler 106 and the ATF warmer 107. The downstream end of the third device pipe 108 is connected to the second radiator pipe 93. In the second cooling water path 100, the cooling water flowing from the adjustment valve 30 to the first device pipe 101 divides and flows to the throttle body 102, the EGR valve 103, and the EGR cooler 104. After the cooling water flowing through the throttle body 102, the EGR valve 103, and the EGR cooler 104 temporarily joins in the second device pipe 105, the cooling water divides and flows to the oil cooler 106 and the ATF warmer 107. The cooling water flowing through the oil cooler 106 and the ATF warmer 107 converges on the third device pipe 108 and flows through the second radiator pipe 93 to the cooling water pump 23.

A third one of the three discharge ports in the adjustment valve 30 is connected to a third cooling water path 110 that circulates the cooling water to a heater core 112 of an air-conditioner. The third cooling water path 110 includes a first heater pipe 111 having a first end connected to the discharge port, the heater core 112 connected to a second end of the first heater pipe 111, and a second heater pipe 113 having a first end connected to the heater core 112. The second heater pipe 113 has a second end connected to the third device pipe 108. After the cooling water flowing to the first heater pipe 111 flows through the heater core 112, the cooling water flows through the second heater pipe 113 to the third device pipe 108. The cooling water flowing to the third device pipe 108 flows through the second radiator pipe 93 to the cooling water pump 23. As described above, when the cooling water flows from the adjustment valve 30 to each of the cooling water paths 90, 100, and 110, the cooling water converges at the front of the cooling water pump 23. The cooling water pump 23 again supplies the cooling water to the water jacket 20.

The adjustment valve 30 includes a relief passage 115. The inside of the adjustment valve 30 is in communication with the first cooling water path 90 through the relief passage 115. The relief passage 115 includes a relief valve 116. When the difference in pressure between a portion of the relief passage 115 connected to the adjustment valve 30 and a portion of the relief passage 115 connected to the first radiator pipe 91 is greater than or equal to a threshold value, the relief valve 116 opens to allow the cooling water to flow from the adjustment valve 30 to the first cooling water path 90. Thus, the relief valve 116 limits an excessive increase in the pressure of the adjustment valve 30.

The structure of the adjustment valve 30 will now be described with reference to FIGS. 2 to 5.

Figure 2:
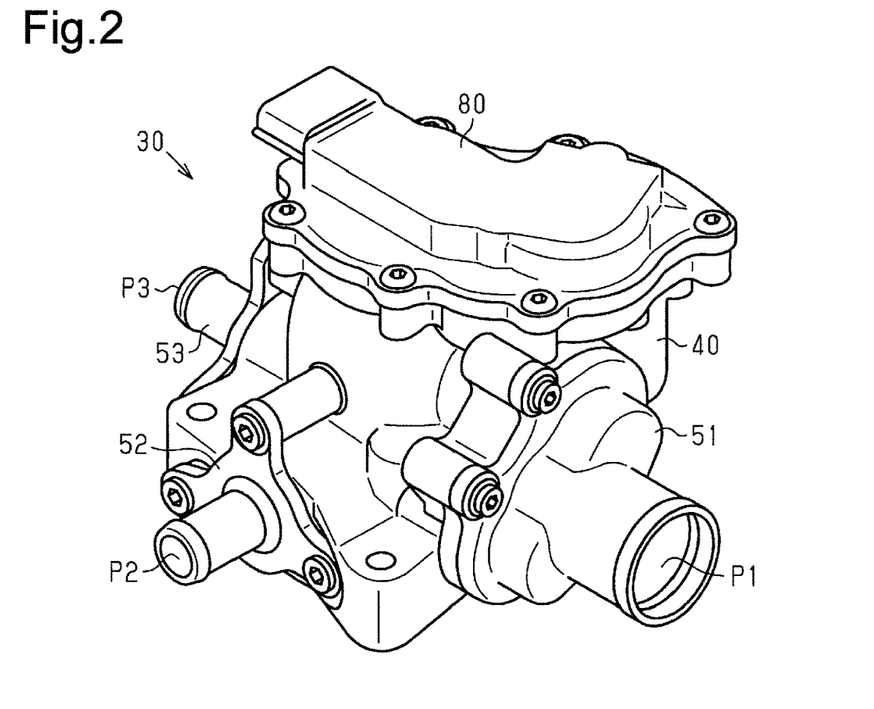
FIG. 2 is a perspective view of an adjustment valve included in the cooling system shown in FIG. 1.

As shown in FIG. 2, the adjustment valve 30 includes three ports serving as the cooling water discharge ports. More specifically, the adjustment valve 30 includes a radiator port P1 connected to the first cooling water path 90, a device port P2 connected to the second cooling water path 100, and a heater port P3 connected to the third cooling water path 110. The ports P1, P2, and P3 are open in different directions. The device port P2 and the heater port P3 have the same inner diameter. The radiator port P1 has a larger inner diameter than the device port P2 and the heater port P3.

Figure 3:
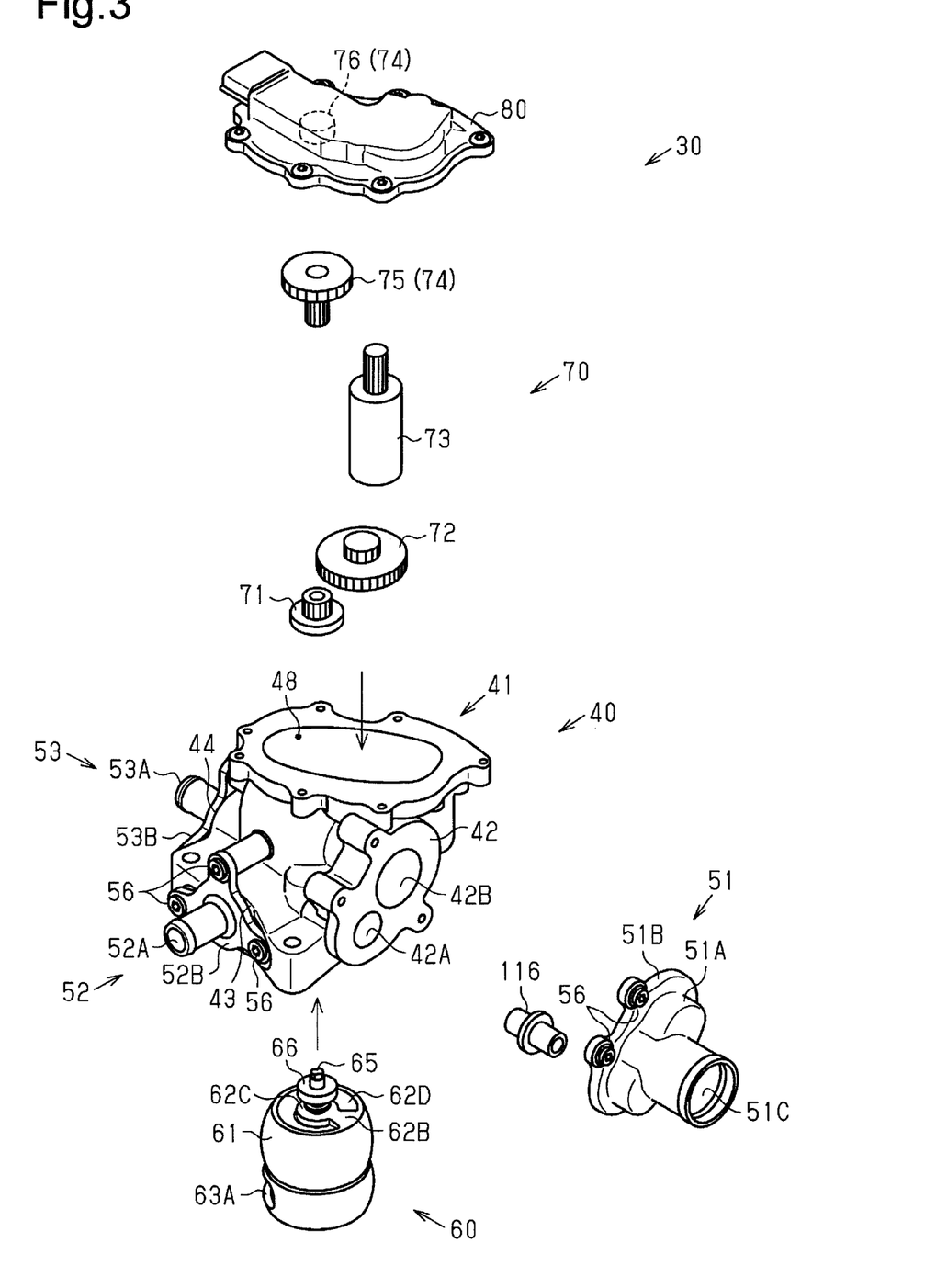
FIG. 3 is an exploded perspective view of the adjustment valve shown in FIG. 2.

As shown in FIG. 3, the adjustment valve 30 includes a housing 40, a rotor 60, a pivot mechanism 70, and a cover 80 as its components. The housing 40 has a hollow structure. The housing 40 includes a body 41 and a first connector 51, a second connector 52, and a third connector 53, which are coupled to the body 41. The first connector 51 includes a first bulge 51A having a circumferential wall and an end wall located on one end of the circumferential wall, a first flange 51B extending around an open end of the first bulge 51A, and a tubular first port 51C connected to the end wall of the first bulge 51A. The first connector 51 is a component of the radiator port Pl. The second connector 52 includes a tubular second port 52A and a second flange 52B extending around one of the two open ends of the second port 52A. The second connector 52 is a component of the device port P2. The third connector 53 includes a tubular third port 53A and a third flange 53B extending around one of the two open ends of the third port 53A. The third connector 53 is a component of the heater port P3. The body 41 includes a first coupling portion 42 coupled to the first connector 51, a second coupling portion 43 coupled to the second connector 52, and a third coupling portion 44 coupled to the third connector 53. The first connector 51 is coupled to the first coupling portion 42 with bolts 56. The second connector 52 is also coupled to the second coupling portion 43 with bolts 56. The third connector 53 is coupled to the third coupling portion 44 with bolts that are not shown in the drawings.

The first coupling portion 42 has two holes having different open areas. The relief valve 116 is fitted into one of the two holes having the smaller open area, namely, a first hole 42A. With the relief valve 116 fitted into the first hole 42A, the first connector 51 is coupled to the first coupling portion 42. Thus, the relief valve 116 is accommodated in the housing 40. Of the two holes of the first coupling portion 42, the first hole 42A defines part of the relief passage 115, and a second hole 42B having a larger open area than the first hole 42A defines part of the radiator port P1. The passage of the radiator port P1 has a larger cross-sectional area than those of the heater port P3 and the device port P2. With the relief valve 116 arranged in the radiator port P1, a sufficient relief amount is ensured in the adjustment valve 30.

Figure 4:
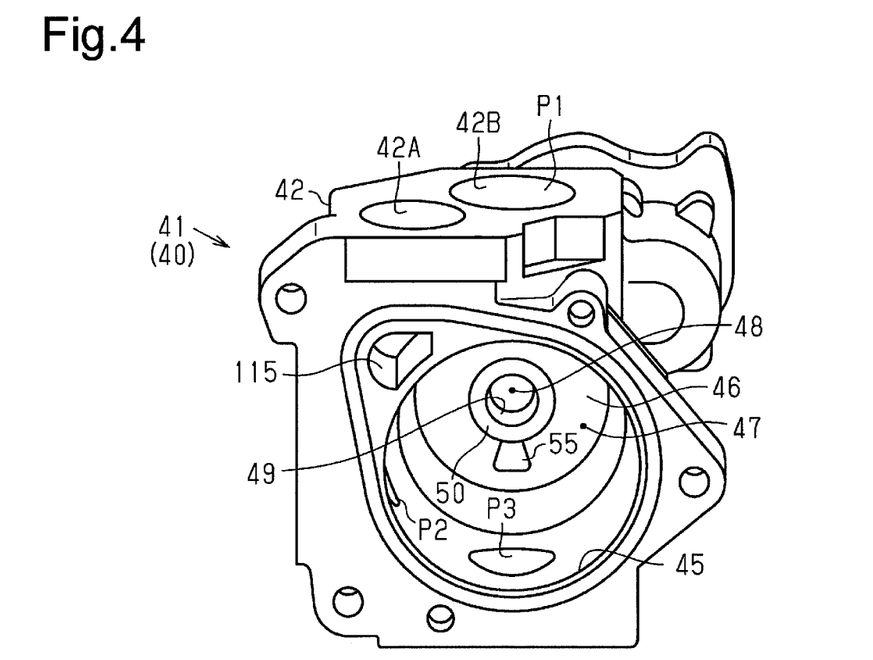
FIG. 4 is a perspective view of a housing of the adjustment valve shown in FIG. 2 taken from a lower side.

As shown in FIG. 4, the body 41 has a lower end portion including an opening 45 and a partition 46 separating the inner part of the body 41 into an upper hollow space and a lower hollow space. The lower hollow space is referred to as an entrance hollow space 47, and the upper hollow space is referred to as an accommodation hollow space 48. The radiator port P1, the device port P2, and the heater port P3 are in communication with the entrance hollow space 47. The partition 46 has a support hole 49 allowing communication between the entrance hollow space 47 and the accommodation hollow space 48. A tubular slide-contact portion 50 projects from the edge of the support hole 49 toward the entrance hollow space 47. A stopper 55 is coupled to the outer side surface of the slide-contact portion 50 and projects outward in the radial direction.

As shown in FIG. 3, the rotor 60 is coupled to a lower inner portion of the body 41, and the pivot mechanism 70 is coupled to an upper inner portion of the body 41.

Figure 5:
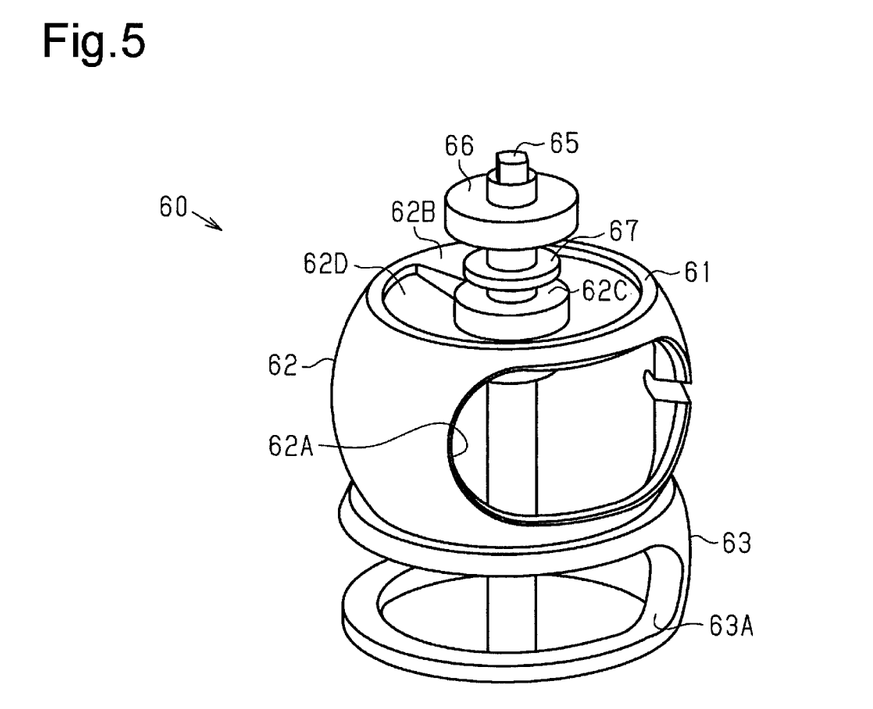
FIG. 5 is a perspective view of a rotor included in the adjustment valve shown in FIG. 2.

As shown in FIG. 5, the rotor 60 includes a valve member 61 and a rotor shaft 65 inserted through the valve member 61. The valve member 61 includes a first valve portion 62 located at the upper side of FIG. 5, that is, close to the upper end (first end) of the rotor shaft 65, and a second valve portion 63 located closer to a second end of the rotor shaft 65 than the first valve portion 62. The first valve portion 62 has a circumferential wall coaxial with the rotor shaft 65. The diameter of the circumferential wall increases from two opposite axial ends to an axially middle portion. The circumferential wall of the first valve portion 62 has a first through hole 62A extending in the circumferential direction. The inner region and outer region of the first valve portion 62 are in communication with each other through the first through hole 62A. The first valve portion 62 includes a projection wall 62B extending radially inward from the upper end of the circumferential wall and an annular support wall 62C connected to the distal end of the projection wall 62B. The support wall 62C surrounds the rotor shaft 65. The upper end portion of the first valve portion 62 has an arcuate engagement hole 62D extending around the support wall 62C in the circumferential direction of the rotor shaft 65.

The second valve portion 63 has a circumferential wall connected to the lower end of the circumferential wall of the first valve portion 62. The inner region of the second valve portion 63 is in communication with the inner region of the first valve portion 62. The circumferential wall of the second valve portion 63 has a second through hole 63A extending in the circumferential direction of the rotor shaft 65. The second through hole 63A is wider than the first through hole 62A in the circumferential direction.

The rotor shaft 65 is coupled to the support wall 62C of the first valve portion 62. The rotor shaft 65 extends through an inner side of the circumferential wall of the first valve portion 62 and an inner side of the circumferential wall of the second valve portion 63. A bearing 66 is coupled to the upper end portion of the rotor shaft 65. A seal 67 is coupled to the rotor shaft 65 between the bearing 66 and the support wall 62C. The seal 67 is annular. When the rotor shaft 65 rotates, the valve member 61 rotates about the rotor shaft 65.

To couple the rotor 60 to the housing 40, the upper end portion of the rotor shaft 65 that is free from the bearing 66 is inserted through the support hole 49 in the partition 46 of the housing 40. The bearing 66 is coupled to the upper end portion of the rotor shaft 65, which projects from the support hole 49 into the accommodation hollow space 48. In this state, the valve member 61 and the seal 67 are located in the entrance hollow space 47, and the bearing 66 is located in the accommodation hollow space 48. When coupled to the upper surface of the partition 46, the bearing 66 rotationally supports the rotor shaft 65 and the valve member 61 relative to the housing 40. The seal 67 is in contact with the lower surface of the slide-contact portion 50 and slides on the lower surface of the slide-contact portion 50 when the rotor shaft 65 rotates.

With the rotor 60 accommodated in the housing 40, the stopper 55 is located in the engagement hole 62D of the valve member 61. When the rotor 60 rotates relative to the housing 40, the stopper 55 relatively moves in the engagement hole 62D. When the stopper 55 is in contact with the projection wall 62B, the rotation of the rotor 60 relative to the housing 40 is restricted. Thus, the valve member 61 of the rotor 60 is capable of rotating relative to the housing 40 within a predetermined range until the stopper 55 comes into contact with the projection wall 62B.

When the relative rotation phase (hereafter, referred to as "the rotor phase θ") of the rotor 60 with respect to the housing 40 is in a certain range, the rotor 60 allows communication between the first through hole 62A and the radiator port P1. That is, when the rotor phase A is not in the range, the radiator port P1 is closed by the valve member 61. Additionally, when the rotor phase e is in another certain range, the rotor 60 allows communication between the second through hole 63A and at least one of the device port P2 and the heater port P3.

In the adjustment valve 30, the outlet pipe 24 is connected to the lower end portion of the housing 40. Thus, the cooling water flowing through the water jacket 20 enters the entrance hollow space 47 through the outlet pipe 24. The cooling water supplied from the outlet pipe 24 to the entrance hollow space 47 flows to the inner region of the rotor 60. When the first through hole 62A is in communication with the radiator port P1, the cooling water flows from the entrance hollow space 47 to the radiator port P1. When the second through hole 63A is in communication with the device port P2, the cooling water flows from the entrance hollow space 47 to the device port P2. When the second through hole 63A is in communication with the heater port P3, the cooling water flows from the entrance hollow space 47 to the heater port P3. The rotor 60 is capable of adjusting the flow rate of the cooling water flowing through each of the ports P1, P2, and P3 by changing the passage cross-sectional areas of the ports P1, P2, and P3. The seal 67, which is in contact with the lower surface of the slide-contact portion 50, limits the flow of the cooling water from the entrance hollow space 47 to the accommodation hollow space 48.

As shown in FIG. 3, the pivot mechanism 70 includes a first gear 71 coupled to the upper end (first end) of the rotor shaft 65 and a second gear 72 engaging with the first gear 71. The second gear 72 is coupled to a motor 73. When the motor 73 rotates the second gear 72, the rotor 60 is driven and rotated via the first gear 71. A phase sensor 74 is attached to the motor 73 to detect the driving amount of the motor 73, or the rotor phase A. The phase sensor 74 includes a detection gear 75 driven and rotated by the motor 73 and a sensor portion 76 detecting the rotation phase of the detection gear 75. The sensor portion 76 is attached to the cover 80. The pivot mechanism 70 is located in the accommodation hollow space 48 of the housing 40. The cover 80 is coupled to close the upper end opening of the body 41. The pivot mechanism 70 is accommodated in the housing 40.

Figure 6:
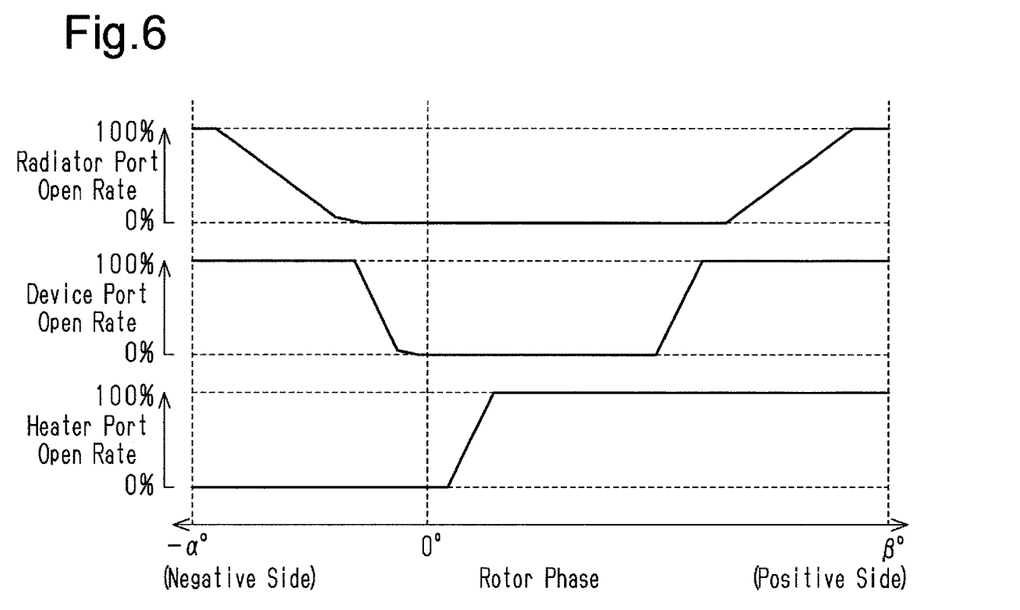
FIG. 6 is a graph showing the relationship between the rotor phase of the adjustment valve shown in FIG. 2 and the open rate of each port.

The relationship between the rotor phase θ of the adjustment valve 30 and the open rate of each of the ports P1, P2, and P3 will now be described.

As shown in FIG. 6, in the adjustment valve 30, when all of the ports P1, P2, and P3 are closed, the rotor phase θ is set to 0°. In this state, the rotor 60 is allowed to rotate in the clockwise direction (positive direction) and the counterclockwise direction (negative direction) as the valve member 61 is viewed from above. The open rate of each of the ports P1, P2, and P3 indicates the rate of the open area of the corresponding one of the ports P1, P2, and P3 so that the open rate is 100% when the port is fully open and the open rate is 0% when the port is fully closed.

The open rate of each of the ports P1, P2, and P3 changes in accordance with the rotor phase θ. More specifically, when the rotor 60 is rotated in the positive direction from the position where the rotor phase θ is 0°, the heater port P3 first starts to open. As the rotor phase θ is increased in the positive direction, the open rate of the heater port P3 increases. After the open rate of the heater port P3 reaches 100% where the heater port P3 is fully open, if the rotor phase θ is further increased, the device port P2 next starts to open. As the rotor phase θ is increased in the positive direction, the open rate of the device port P2 increases. After the open rate of the device port P2 reaches 100% where the device port P2 is fully open, if the rotor phase θ is further increased, the radiator port P1 next starts to open. As the rotor phase θ is increased in the positive direction, the open rate of the radiator port P1 increases. When β° denotes the rotor phase θ at which the projection wall 62B is in contact with the stopper 55, the radiator port P1 becomes fully open before the rotor phase θ reaches β°. From this state, all of the ports P1, P2, and P3 are fully open until the rotor phase θ reaches β°. As described above, in the adjustment valve 30, the end of a movable range of the rotor 60 and the motor 73 in the positive direction is where the rotor phase θ is β°. At this phase, all of the ports P1, P2, and P3 are fully open.

When the rotor 60 is rotated in the negative direction from the position where the rotor phase θ is 0°, the device port P2 first starts to open. As the rotor phase θ is increased in the negative direction, the open rate of the device port P2 increases. Before the open rate of the device port P2 reaches 100%, more specifically, from a position slightly before the position where the device port P2 becomes fully open, the radiator port P1 starts to open. As the rotor phase θ is increased in the negative direction, the open rate of the device port P2 increases, and the device port P2 becomes fully open. The open rate of the radiator port P1 also increases. When −α° denotes the rotor phase θ at which the projection wall 62B is in contact with the stopper 55, the radiator port P1 becomes fully open before the rotor phase θ reaches −α°. From this state, the device port P2 and the radiator port P1 are fully open until the rotor phase θ reaches −α°. As described above, in the adjustment valve 30, the end of the movable range of the rotor 60 and the motor 73 in the negative direction is the position where the rotor phase θ is −α°. At this phase, the radiator port P1 and the device port P2 are fully open. The heater port P3 is constantly fully closed in a range where the rotor phase θ is located at the negative side from 0°.

As shown in FIG. 1, a navigation device 120 is installed in the vehicle to perform a route guidance of the vehicle. The navigation device 120 includes an altitude information registration portion 121 and a position detection portion 122 as its functional portions. The altitude information registration portion 121 registers map information and altitude information of each position in the map information. The position detection portion 122 is, for example, a global positioning system (GPS) and detects the current position of the vehicle.

The vehicle further includes a control unit 130 controlling the cooling system 10 of the internal combustion engine. The controller for the cooling system of the internal combustion engine includes the navigation device 120 and the control unit 130. The control unit 130 receives output signals from the first water temperature sensor 21 and the second water temperature sensor 25. The control unit 130 also receives output signals from an airflow meter 26, which detects an amount of intake air drawn into a combustion chamber of the internal combustion engine, and an ignition switch 27. The control unit 130 is configured to control the flow rate of the cooling water flowing to each of the cooling water paths 90, 100, and 110 by controlling the adjustment valve 30 based on these output signals during running of the internal combustion engine. Additionally, the control unit 130 executes flow-restriction control during start-up of the internal combustion engine. In the flow-restriction control, the rotor phase θ of the adjustment valve 30 is controlled to 0° to stop discharging the cooling water from the water jacket 20 and limit the flow of the cooling water in the water jacket 20. As a result, the temperature of the engine body 200 is quickly increased during a start-up of the internal combustion engine. The control unit 130 is configured to perform communication with the navigation device 120 through, for example, a vehicle network.

Figure 7:
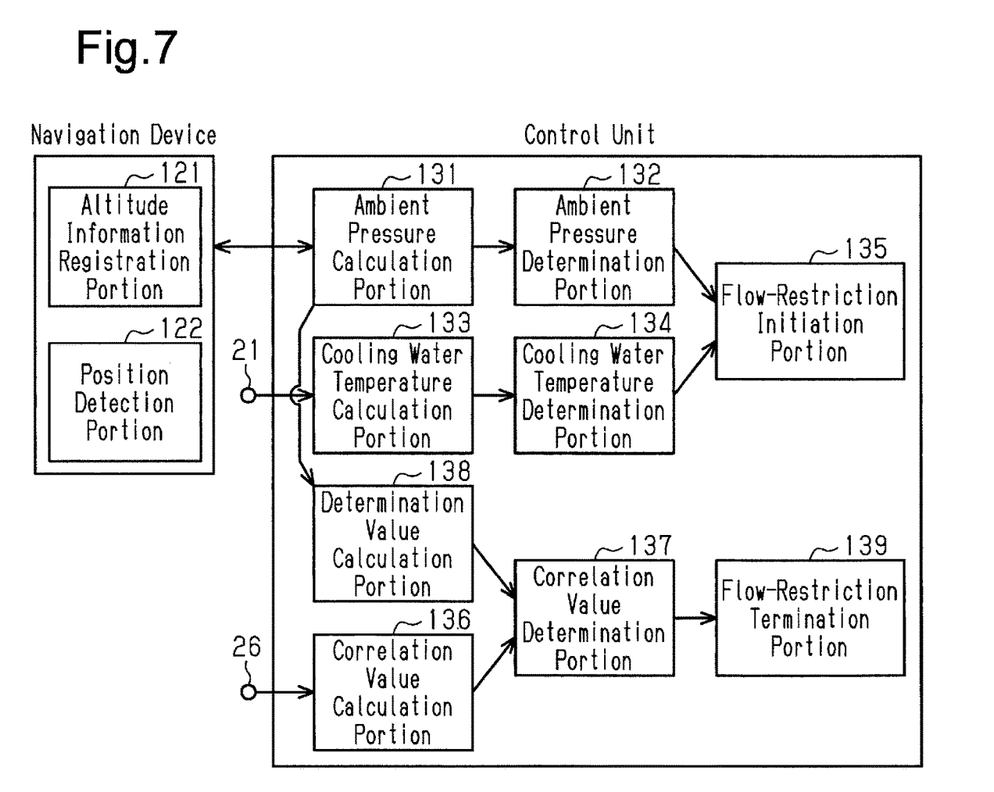
FIG. 7 is a functional block diagram of a control unit and a navigation device, which are components of the controller shown in FIG. 1.

As shown in FIG. 7, the control unit 130 includes an ambient pressure calculation portion 131, an ambient pressure determination portion 132, a cooling water temperature calculation portion 133, a cooling water temperature determination portion 134, a flow-restriction initiation portion 135, a correlation value calculation portion 136, a correlation value determination portion 137, a determination value calculation portion 138, and a flow-restriction termination portion 139 as its functional portions.

The ambient pressure calculation portion 131 communicates with the navigation device 120 and calculates an ambient pressure based on the current position of the vehicle detected by the position detection portion 122 of the navigation device 120 and the altitude information of the altitude information registration portion 121. The ambient pressure refers to the atmospheric pressure at the position where the vehicle including the cooling system 10 of the internal combustion engine is located. The ambient pressure calculation portion 131 calculates the altitude of the current position based on the current position of the vehicle detected by the position detection portion 122 and the altitude information of the altitude information registration portion 121. The ambient pressure calculation portion 131 stores a map specifying the relationship between the altitude and the ambient pressure. The ambient pressure calculation portion 131 obtains the ambient pressure by performing a map calculation based on the altitude of the current position. The map specifying the relationship between the altitude and the ambient pressure may be obtained in advance, for example, through simulations.

The ambient pressure determination portion 132 determines whether or not the ambient pressure calculated by the ambient pressure calculation portion 131 is greater than a threshold value. The cooling water temperature calculation portion 133 calculates the temperature of the cooling water in the water jacket 20 based on output signals from the first water temperature sensor 21. The cooling water temperature determination portion 134 determines whether or not the temperature of the cooling water calculated by the cooling water temperature calculation portion 133 is lower than or equal to a predetermined temperature.

When the ambient pressure determination portion 132 determines that the ambient pressure is greater than the threshold value and the cooling water temperature determination portion 134 determines that the temperature of the cooling water is lower than or equal to the predetermined temperature, the flow-restriction initiation portion 135 determines that the condition for initiating the flow-restriction control is satisfied. When the initiation condition is satisfied, the flow-restriction initiation portion 135 controls the rotor phase θ of the adjustment valve 30 to 0° to initiate the flow-restriction control.

The correlation value calculation portion 136 calculates an accumulated intake air amount ΣGa, which is an intake air amount accumulated from the initiation of the flow-restriction control, based on output signals from the airflow meter 26. The accumulated intake air amount ΣGa is the total amount of air drawn into the combustion chamber of the engine body 200 after the initiation of the flow-restriction control. As the accumulated intake air amount ΣGa increases, the amount of heat generated in the engine body 200 increases. Accordingly, the amount of heat transmitting from the engine body 200 to the cooling water in the water jacket 20 increases. Therefore, the accumulated intake air amount ΣGa is a correlation value, or a correlation parameter, correlated with the temperature of the cooling water in the water jacket 20.

The correlation value determination portion 137 determines whether or not the accumulated intake air amount ΣGa calculated by the correlation value calculation portion 136 is greater than or equal to a determination value. The determination value calculation portion 138 calculates the determination value, which is used by the correlation value determination portion 137, based on the ambient pressure calculated by the ambient pressure calculation portion 131.

When the correlation value determination portion 137 determines that the accumulated intake air amount ΣGa is greater than or equal to the determination value, the flow-restriction termination portion 139 terminates the flow-restriction control.

The flow of the series of processes related to the flow-restriction control executed by the control unit 130 will now be described with reference to the flowchart of FIG. 8. The series of processes of the flow-restriction control is executed whenever the internal combustion engine is started. Whether or not the internal combustion engine is started can be determined based on the switching of the ignition switch 27 from OFF to ON.

Figure 8:
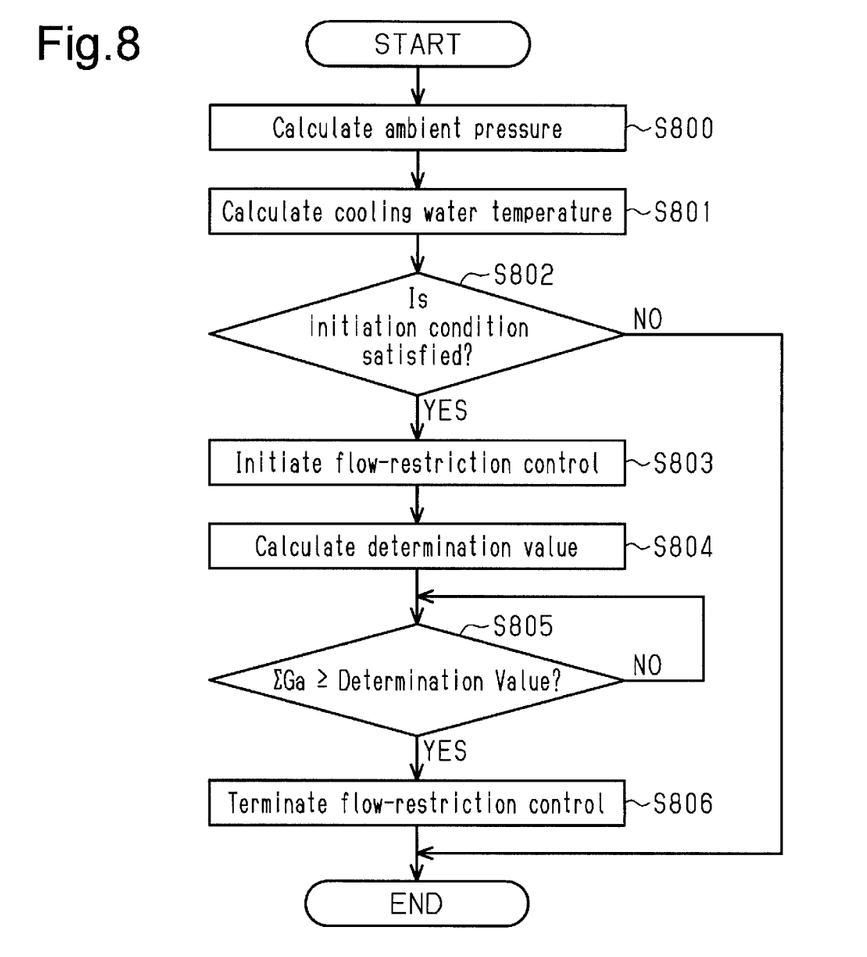
FIG. 8 is a flowchart showing the series of processes of flow-restriction control executed by the control unit shown in FIG. 7.

As shown in FIG. 8, when the series of processes is executed, the ambient pressure calculation portion 131 of the control unit 130 communicates with the navigation device 120 to obtain the altitude information of the current position. The ambient pressure calculation portion 131 calculates an ambient pressure based on the altitude information of the current position (step S800).

The cooling water temperature calculation portion 133 calculates the temperature of the cooling water in the water jacket 20 based on output signals from the first water temperature sensor 21 (step S801). When the ambient pressure and the temperature of the cooling water are calculated, the control unit 130 determines whether or not the condition for initiating the flow-restriction control is satisfied (step S802). In step S802, the ambient pressure determination portion 132 determines whether or not the ambient pressure calculated in step S800 is greater than the threshold value. Additionally, the cooling water temperature determination portion 134 determines whether or not the temperature of the cooling water calculated in step S801 is lower than or equal to the predetermined temperature. In the present embodiment, the boiling point of the cooling water located at an altitude of 0 m is used as a reference boiling point, and the threshold value is set to an ambient pressure at which the boiling point of the cooling water becomes a determination boiling point that is lower than the reference boiling point by a predetermined temperature. Subsequently, when the ambient pressure determination portion 132 determines that the ambient pressure is greater than the threshold value and the cooling water temperature determination portion 134 determines that the temperature of the cooling water is lower than or equal to the predetermined temperature, the flow-restriction initiation portion 135 determines that the initiation condition is satisfied (step S802: YES). More specifically, in step S802, when the boiling point of the cooling water is higher than the determination boiling point, it is determined that the initiation condition is satisfied. The flow-restriction initiation portion 135 initiates the flow-restriction control (step S803). The rotor phase θ of the adjustment valve 30 is controlled to 0° to stop discharging the cooling water from the water jacket 20 and limit the flow of the cooling water in the water jacket 20.

In step S804, the determination value calculation portion 138 calculates a determination value. The determination value calculation portion 138 calculates the determination value based on the ambient pressure calculated in step S800. A map specifying the relationship between the ambient pressure and the determination value is stored in the determination value calculation portion 138 in advance.

Figure 9:
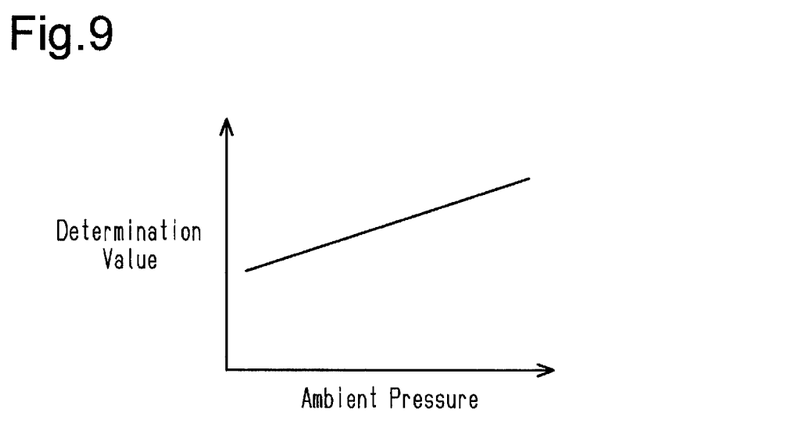
FIG. 9 is a map showing the relationship between the ambient pressure and the determination value used in the flow-restriction control shown in FIG. 8.

FIG. 9 shows a map in which the determination value is set to linearly increase as the ambient pressure increases so that the determination value is smaller when the ambient pressure is low than when the ambient pressure is high. The map may be obtained in advance through experiments or simulations.

In step S805, the correlation value calculation portion 136 calculates the accumulated intake air amount ΣGa from the initiation of the flow-restriction control. The correlation value calculation portion 136 calculates the accumulated intake air amount ΣGa by accumulating an intake air amount calculated in each predetermined cycle from the initiation of the flow-restriction control to the termination of the flow-restriction control. In step S805, the correlation value determination portion 137 determines whether or not the accumulated intake air amount ΣGa calculated by the correlation value calculation portion 136 is greater than or equal to the determination value. When the calculation of the accumulated intake air amount ΣGa is started, the accumulated intake air amount ΣGa is less than the determination value. Thus, the negative determination is made in step S805 (step S805: NO). In this case, the control unit 130 does not proceed to the step after step S805 and repeatedly executes step S805. When the accumulated intake air amount ΣGa increases and becomes greater than or equal to the determination value, the correlation value determination portion 137 determines that the accumulated intake air amount ΣGa calculated by the correlation value calculation portion 136 is greater than or equal to the determination value (step S805: YES). In the present embodiment, the determination value is set to an accumulated intake air amount $\Sigma Ga$ obtained when the temperature of the cooling water is a determination water temperature that is lower than the boiling point by a predetermined temperature. More specifically, when the accumulated intake air amount $\Sigma Ga$ is greater than or equal to the determination value, the temperature of the cooling water is increased to the determination water temperature. When it is determined that the accumulated intake air amount $\Sigma Ga$ is greater than or equal to the determination value, the flow-restriction termination portion 139 terminates the flow-restriction control (step S806). The control unit 130 ends the series of processes of the flow-restriction control.

In step S802, when the ambient pressure determination portion 132 determines that the ambient pressure is less than or equal to the threshold value or the cooling water temperature determination portion 134 determines that the temperature of the cooling water is greater than the predetermined temperature, the flow-restriction initiation portion 135 does not determine that the initiation condition is satisfied (step S802: NO). In this case, the flow-restriction initiation portion 135 does not execute the following processes, that is, does not initiate the flow-restriction control, and ends the series of processes related to the flow-restriction control.

The operation and advantages of the present embodiment will now be described.

(1) The flow-restriction control quickly increases the temperature of the cooling water in the engine body 200. The boiling point of cooling water is decreased as the pressure applied to the cooling water is decreased. In the present embodiment, the determination value that determines termination of the flow-restriction control is calculated to be smaller when the ambient pressure is low than when the ambient pressure is high. Thus, as the pressure applied to the cooling water is decreased and the boiling point of the cooling water is decreased, the flow-restriction control is terminated at lower temperatures of the cooling water. As a result, even when the pressure applied to the cooling water is low, the flow-restriction control is appropriately terminated. With the consideration made to the pressure applied to the cooling liquid regarding the termination of the flow-restriction control, the temperature of the cooling water will not increase to a temperature high enough for the cooling water to boil in the flow-restriction control. With the present embodiment, the boiling of the cooling water caused by the flow-restriction control is limited.

(2) In the present embodiment, when the ambient pressure is greater than the threshold value, execution of the flow-restriction control is allowed. When the ambient pressure is less than or equal to the threshold value and the boiling point of the cooling water is decreased, execution of the flow-restriction control is prohibited. More specifically, the condition for executing the flow-restriction control includes a condition in which the ambient pressure is greater than the threshold value. With the consideration made to the pressure applied to the cooling water regarding the execution of the flow-restriction control, execution of the flow-restriction control is limited in a situation in which the boiling point of the cooling water is decreased and the cooling water is prone to boil. Thus, the flow-restriction control is appropriately executed.

(3) When an ambient pressure is detected with a sensor, variations in detection values caused by the differences between sensors need to be considered. In the present embodiment, the ambient pressure calculation portion 131 calculates an ambient pressure based on the current position detected by the position detection portion 122 of the navigation device 120 and the altitude information of the altitude information registration portion 121. Thus, individual differences of a sensor detecting an ambient pressure do not need to be considered when an ambient pressure is calculated.

The above embodiment may be modified as follows. Further, the modified examples may be combined.

In the controller for the cooling system of the internal combustion engine, the altitude information registration portion 121 of the navigation device 120 may be configured so that the altitude information is updatable. More specifically, the navigation device 120 is configured to communicate with a separate update information registration portion via a network so that the altitude information registered in the altitude information registration portion 121 is updated based on update information registered in the update information registration portion. With such a configuration, an ambient pressure is calculated based on the latest altitude information.

The navigation device 120 includes the altitude information registration portion 121 and the position detection portion 122. However, another device may include the altitude information registration portion 121 and the position detection portion 122. For example, the control unit 130 may include the altitude information registration portion 121 and the position detection portion 122. In another example, an external device arranged outside the vehicle may include the altitude information registration portion 121. In this case, the navigation device 120 and the external device may be configured to communicate with each other via, for example, a network. The external device may send altitude information to the control unit 130 via the navigation device 120, and the navigation device 120 may send position information to the control unit 130. Alternatively, the control unit 130 and the external device may be configured to communicate with each other via, for example, a network so that the navigation device 120 sends position information to the control unit 130 and the external device sends altitude information to the control unit 130.

The ambient pressure calculation portion 131 performs a map calculation to obtain an ambient pressure based on the map specifying the relationship between the ambient pressure and the altitude. However, the mode of calculating the ambient pressure may be changed. For example, the ambient pressure may be obtained from altitude information by a calculation based on a predetermined mathematical expression.

The ambient pressure calculation portion 131 may be included in another device. For example, the navigation device 120 or a device arranged outside the vehicle may include the ambient pressure calculation portion 131. In such a configuration, information of the ambient pressure calculated by the ambient pressure calculation portion 131 may be sent to the control unit 130 via, for example, a network.

The ambient pressure calculation portion 131 may calculate an ambient pressure based on output signals from an ambient pressure sensor detecting the ambient pressure. In this case, the altitude information registration portion 121 and the position detection portion 122 may be omitted.

In the flow-restriction initiation portion 135, the condition for initiating the flow-restriction control includes a condition in which the ambient pressure calculated by the ambient pressure calculation portion 131 is greater than the threshold value. Instead of such a configuration, the flow-restriction control may be initiated under the initiation condition including a condition in which an altitude of the current position calculated based on the altitude information registered in the altitude information registration portion 121 and information of the current position detected by the position detection portion 122 is less than or equal to a predetermined altitude. As described above, instead of calculating an ambient pressure, it may be determined that the ambient pressure is greater than the threshold value based on a parameter correlated with the ambient pressure. With such a configuration, the same operation and advantages as those described above in (2) are obtained.

When the ambient pressure is greater than the threshold value, the flow-restriction initiation portion 135 determines that part of the condition for initiating the flow-restriction control is satisfied. However, the condition for initiating the flow-restriction control may be changed. For example, the condition for initiating the flow-restriction control does not necessarily have to include the condition in which the ambient pressure is greater than the threshold value. In this case, step S800 shown in FIG. 8 is omitted. Additionally, in step S802, when the cooling water temperature determination portion 134 determines that the temperature of the cooling water is less than or equal to a predetermined temperature, the flow-restriction initiation portion 135 determines that the initiation condition is satisfied. Further, the initiation condition may include other conditions.

In the above embodiment, the correlation value determination portion 137 calculates the accumulated intake air amount ΣGa after the initiation of the flow-restriction control as the correlation value correlated with the temperature of the cooling water in the water jacket 20. The correlation value is not limited to such a value. For example, the temperature of the cooling water detected by the first water temperature sensor 21 or the second water temperature sensor 25 may be used as the correlation value. In another example, a sensor detecting the temperature of the engine body 200 may be arranged so that the temperature detected by the sensor is used as the correlation value.

In the series of processes of the flow-restriction control, the flow-restriction control is terminated when the accumulated intake air amount ΣGa is greater than or equal to the determination value. In addition to or instead of the process, the flow-restriction control may be terminated when the temperature of the cooling water detected by the first water temperature sensor 21 is higher than or equal to a first determination temperature. That is, the flow-restriction control may be terminated when at least one of the conditions, which are the accumulated intake air amount ΣGa is greater than or equal to the determination value and the temperature of the cooling water is higher than or equal to the first determination temperature, is satisfied. Further, in addition to or instead of each of the above configurations, the flow-restriction control may be terminated when the temperature of the cooling water detected by the second water temperature sensor 25 is higher than or equal to a second determination temperature. That is, the flow-restriction control may be terminated when at least one of the conditions, which are the accumulated intake air amount ΣGa is greater than or equal to the determination value and the temperature of the cooling water is higher than or equal to the second determination temperature, is satisfied. The flow-restriction control may be terminated when at least one of the conditions, which are the accumulated intake air amount ΣGa is greater than or equal to the determination value, the temperature of the cooling water is higher than or equal to the first determination temperature, and the temperature of the cooling water is higher than or equal to the second determination temperature, is satisfied. In each of the above conditions used to determine the termination of the flow-restriction control, the same operation and advantages as those described in (1) are obtained by setting each determination value to a smaller value when the ambient pressure is low than when the ambient pressure is high.

The determination value calculation portion 138 calculates the determination value based on the map showing the relationship between the ambient pressure and the determination value. In the map, the determination value is set to be directly proportional to the ambient pressure so that the determination value is smaller when the ambient pressure is low than when the ambient pressure is high. The mode of setting the determination value is not limited to that described above.

Figure 10:
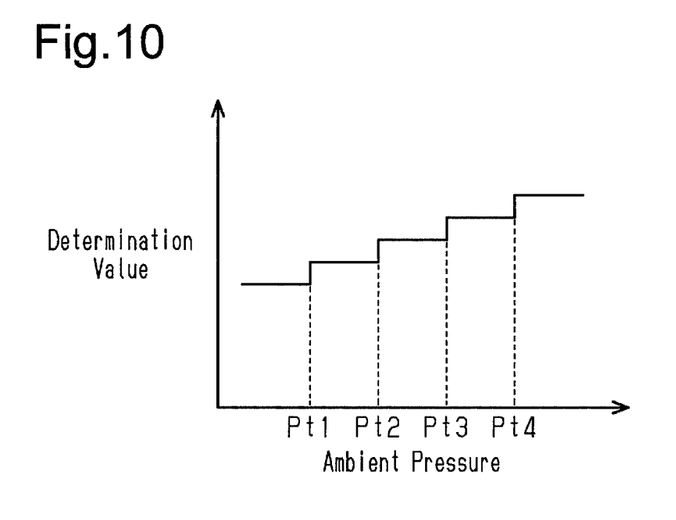
FIG. 10 is a map showing another example of the relationship between the ambient pressure and the determination value.

For example, as shown in FIG. 10, a map in which the determination value changes in a stepped manner may be used. When the flow-restriction control is executed based on such a map, the temperature of the cooling water in the water jacket 20 at which the flow-restriction control is terminated changes in a stepped manner in accordance with the ambient pressure. In the map, the determination value is set to change when the ambient pressure is at threshold values (Pt1, Pt2, Pt3, and Pt4). The determination value is smaller when the ambient pressure is low than when the ambient pressure is high with reference to the threshold value Pt1. In the same manner, the determination value is smaller when the ambient pressure is low than when the ambient pressure is high with reference to each of the remaining threshold values Pt2, Pt3, and Pt4. Even when such a map is used so that the determination value changes in a stepped manner, the temperature of the cooling water in the water jacket 20 at which the flow-restriction control is terminated is lower when the ambient pressure is low than when the ambient pressure is high.

In the above embodiment, the ambient pressure calculation portion 131 is provided so that the determination value is set in accordance with the ambient pressure calculated by the ambient pressure calculation portion 131. However, the mode of setting the determination value is not limited to such a value. For example, the determination value may be set to be smaller as the altitude of the current position calculated by the altitude information registration portion 121 increases. As described above, the determination value may be calculated to be smaller as the ambient pressure decreases based on a parameter correlated with the ambient pressure instead of calculating the ambient pressure.

The cooling liquid in the cooling system 10 of the internal combustion engine is not limited to cooling water. For example, the cooling liquid may be a cooling liquid containing a liquid other than water as a main component.

The control unit 130 may be configured to be circuitry including 1) one or more processors operating in accordance with a computer program (software), 2) one or more dedicated hardware circuits such as dedicated hardware (application specific integrated circuit: ASIC) executing at least part of various processes, or 3) a combination of these. A processor includes a CPU and a memory such as a RAM or a ROM. The memory stores a program code or instruction implemented so that the CPU executes a process. The memory, or a computer readable medium, includes any available medium accessible with a versatile or dedicated computer.

The invention claimed is:

1. A controller for a cooling system of an internal combustion engine, wherein the cooling system includes a water jacket formed in an engine body of the internal combustion engine and including a passage for a cooling liquid that cools the engine body, a cooling liquid pump configured to supply the cooling liquid to the water jacket, and an adjustment valve configured to adjust a flow rate of the cooling liquid discharged from the water jacket, the adjustment valve being in fluid communication with an outlet pipe connected to the water jacket and including a discharge port in fluid communication with a radiator, the controller comprising:

circuitry configured to execute flow-restriction control that controls the adjustment valve to restrict discharge of the cooling liquid from the water jacket such that the cooling liquid does not flow to the radiator, thereby increasing temperature of the engine body,  wherein the circuitry is configured to execute the flow-restriction control so that temperature of the cooling liquid in the water jacket at which the flow-restriction control is terminated is lower when an ambient pressure is lower than a predetermined value than when the ambient pressure is higher than the predetermined value, and  wherein the circuitry is configured to allow execution of the flow-restriction control when the ambient pressure is greater than a threshold value, and prohibit execution of the flow-restriction control when the ambient pressure is less than or equal to the threshold value.

2. The controller according to claim 1, wherein the circuitry is configured to  terminate the flow-restriction control when the circuitry determines that a correlation value, which is correlated with the temperature of the cooling liquid in the water jacket, is greater than or equal to a determination value, and  set the determination value to be smaller when the ambient pressure is lower than the predetermined value than when the ambient pressure is higher than the predetermined value.

3. The controller according to claim 1, wherein the circuitry is configured to calculate the ambient pressure based on a current position and altitude information.

4. The controller according to claim 1, wherein the circuitry is configured to  allow execution of the flow-restriction control when the temperature of the cooling liquid in the water jacket is less than or equal to a predetermined temperature, and  prohibit execution of the flow-restriction control when the temperature of the cooling liquid in the water jacket is greater than the predetermined temperature.

5. A controller for a cooling system of an internal combustion engine, wherein the cooling system includes a water jacket formed in an engine body of the internal combustion engine and including a passage for a cooling liquid that cools the engine body, a cooling liquid pump configured to supply the cooling liquid to the water jacket, and an adjustment valve configured to adjust a flow rate of the cooling liquid discharged from the water jacket, the controller comprising:

circuitry configured to execute flow-restriction control that controls the adjustment valve to restrict discharge of the cooling liquid from the water jacket, thereby increasing temperature of the engine body,  wherein the circuitry is configured to calculate an accumulated intake air amount, which is an intake air amount accumulated from initiation of the flow-restriction control, and terminate the flow-restriction control when the accumulated intake air amount is greater than or equal to a determination value, and  wherein the determination value is calculated to be smaller when the ambient pressure is lower than a predetermined value than when the ambient pressure is higher than the predetermined value.

6. The controller according to claim 5, wherein the circuitry is configured to calculate the ambient pressure based on a current position and altitude information.

\* \* \* \* \*